(12) United States Patent
Bristol

(10) Patent No.: US 7,226,261 B1
(45) Date of Patent: Jun. 5, 2007

(54) TOGGLE ASSEMBLY

(76) Inventor: Steven L. Bristol, 120 N. Birchwood Dr., Fremont, NE (US) 68025

( * ) Notice: Subject to any disclaimer, the term of this patent is extended or adjusted under 35 U.S.C. 154(b) by 0 days.

(21) Appl. No.: 11/297,773

(22) Filed: Dec. 8, 2005

(51) Int. Cl.
*F16B 21/00* (2006.01)

(52) U.S. Cl. ...................................... 411/342; 411/340

(58) Field of Classification Search ......... 411/340–346
See application file for complete search history.

(56) References Cited

U.S. PATENT DOCUMENTS

| 1,168,257 | A | * | 1/1916 | Kennedy | 411/346 |
| 2,061,634 | A | * | 11/1936 | Pleister | 411/342 |
| 2,616,327 | A | * | 11/1952 | Karitzky | 411/346 |
| 2,916,235 | A | * | 12/1959 | Nagel | 248/497 |
| 3,241,420 | A | * | 3/1966 | Passer | 411/346 |
| 3,302,508 | A | * | 2/1967 | Topf | 411/341 |
| 5,197,567 | A | * | 3/1993 | Rabalais | 184/1.5 |
| 5,702,218 | A | * | 12/1997 | Onofrio | 411/552 |

* cited by examiner

*Primary Examiner*—Flemming Saether
(74) *Attorney, Agent, or Firm*—Thomte, Mazour & Niebergall

(57) ABSTRACT

A toggle assembly is provided for use with a fastener to engage a supportive structure. One or more teeth are positioned adjacent a lower peripheral edge of one or both of the toggle wing members. The teeth are oriented to engage a rearward surface of the supportive structure once the toggle assembly is passed through an opening formed in the supportive structure and the toggle assembly moves into an open position. One alternate embodiment provides inserts that may be selectively disclosed within recesses of the toggle wing members and provides one or more teeth for engagement with a rearward surface of a supportive structure to substantially prevent rotation of the toggle assembly while a fastener is passed therethrough and tightened.

14 Claims, 3 Drawing Sheets

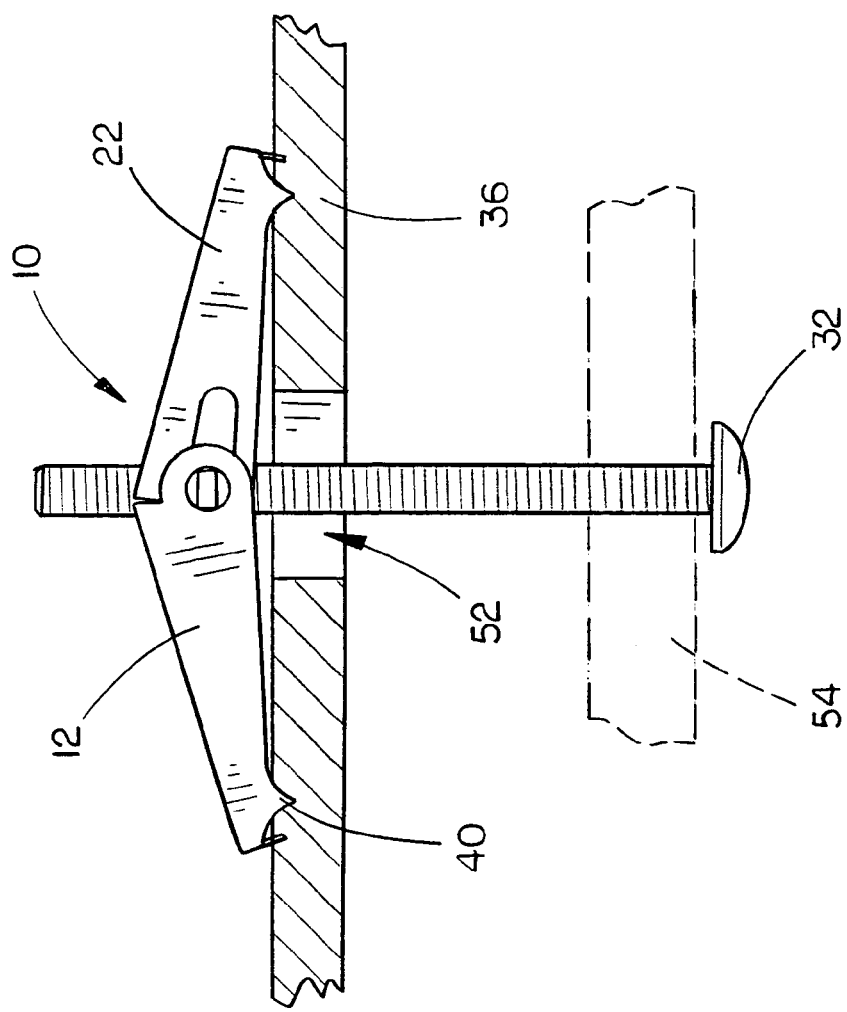
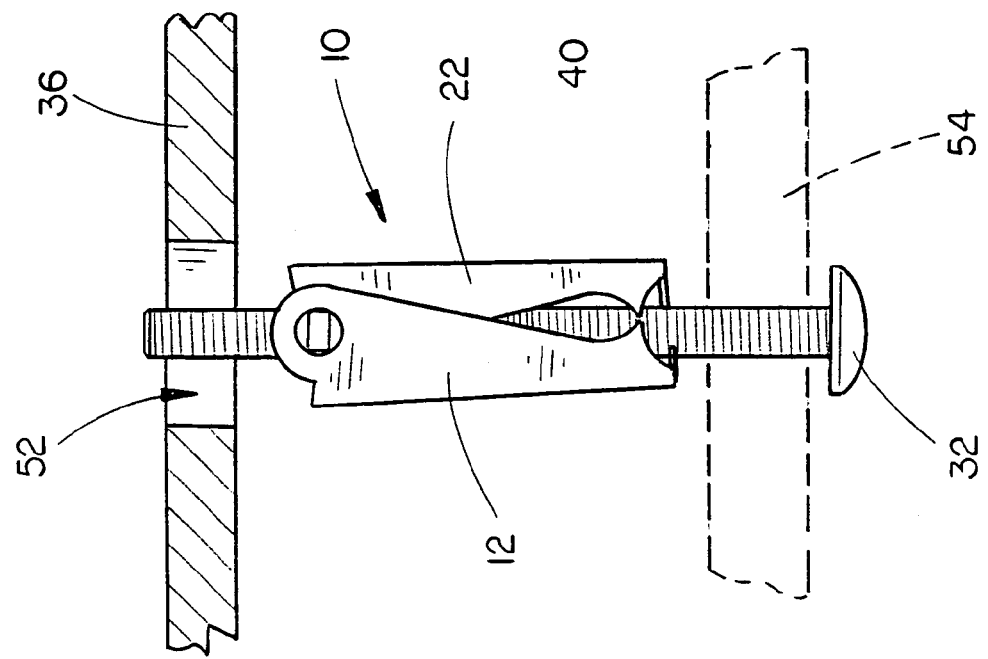

TOGGLE ASSEMBLY

BACKGROUND

Toggle bolts have been used for many years to support various objects on walls and ceilings, where there is no structural member, such as a joist or stud behind the immediate wall or ceiling surface. Toggle bolts typically provide a strong connection with the supportive structure and are frequently used to support shelves, cabinets, hanging plants, and the like. Toggle bolts are relatively inexpensive to manufacture and easy to use. However, the common typical toggle bolt suffers from at least one serious shortcoming. When a toggle bolt assembly is passed through an opening in a supportive structure, the opposite wings of the toggle assembly expand into an open position. A lower peripheral edge of the wing members must be engaged with a rearward surface of the supportive structure while the bolt is turned. This can oftentimes be difficult as most methods of advancing such bolts utilize a screwdriver or a socket wrench, which use a combination of turning, downward pressure to advance the bolt. More times than not, the lower peripheral edge portions of the toggle wing members simply slide along the rearward surface of the supportive structure, preventing proper advancement of the bolt through the toggle. Accordingly, proper securement and tightening of typical toggle bolts can be time consuming and frustrating.

Accordingly, what is needed is a novel toggle assembly that may be selectively engaged with the rearward surface of a supportive structure in such a manner that substantially prevents movement of the toggle with respect to the supportive structure while the bolt is advanced through the toggle and tightened.

SUMMARY

This Summary is provided to introduce a selection of concepts in a simplified form that are further described below in the Detailed Description. This Summary is not intended to identify key features or essential features of the claimed subject matter. Moreover, this Summary is not intended for use as an aid in determining the scope of the claimed subject matter.

The toggle assembly of the present invention is provided for use with a fastener, such as a bolt, to engage a supportive structure, such as a wall, ceiling, and the like. The toggle assembly is generally provided with a first wing member having opposite first and second end portions, an upper end portion and a lower edge portion. A second wing member is provided, having opposite first and second end portions, an upper portion and a lower edge portion. The first end portions of the first and second wing members are coupled with one another so that the first and second wing members may be selectively moved between open and closed positions with respect to one another. A securement member, such as a nut, is provided adjacent the first end portions of the first and second wing members or selectively and securably receiving the fastener. In a preferred embodiment, at least one tooth is positioned adjacent the lower edge portion of either or both the first and second wing members. The tooth is generally provided with a point that is shaped and positioned to engage the supportive structure when the first and second wing members are in an open position and the lower edge portions of the first and second wing members are positioned closely adjacent the supportive structure.

The design of the present invention permits for positioning of a plurality of teeth along opposite sides or an end portion of the lower edge portions of one or both of the first and second wing members. In another preferred embodiment, a separate insert is provided that is shaped and sized to be selectively disposed in a recess formed in either or both of the first and second wing members, along their lower edge portions. The one or more teeth utilized by the toggle assembly may be provided as a part of the insert in one or more various positions and patterns.

In use, an opening is formed in the supportive structure. The first and second wing members of the toggle assembly are moved to a closed position and passed through the opening. Once through the opening, the first and second wing members move into an open position. The one or more teeth may then be engaged with a rearward surface of the supportive structure by applying a rearward force to the fastener. With the one or more teeth engaged with the rearward surface of the supportive structure, the fastener may be advanced through the toggle assembly and tightened accordingly with little or no movement of the toggle assembly with respect to the supportive structure.

It is therefore a principal object of the present invention to provide a toggle assembly having one or more teeth that engage a rearward surface of a supportive structure to substantially prevent rotation of the toggle assembly while a fastener is passed therethrough.

A further object of the present invention is to provide a toggle assembly insert that may be selectively disposed within the recesses of a toggle in a manner that dispose one or more teeth adjacent a lower edge portion of the toggle for engagement with a rearward surface of a supportive structure.

Still another object of the present invention is to provide a toggle assembly having a plurality of engagement teeth disposed along a lower peripheral edge portion of the toggle assembly that are shaped and positioned to permit the toggle to be moved to a fully closed position while providing a structure for engaging a rearward surface of a supportive structure while in an open position.

Yet another object of the present invention is to provide a toggle assembly that substantially limits the movement of the toggle with respect to a rearward surface of a supportive structure when a fastener is advanced through the toggle.

A further object of the present invention is to provide a toggle assembly that is relatively simple in design and use.

These and other objects of the present invention will be apparent upon a review of the Detailed Description herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a side elevation view of one embodiment of the toggle assembly of the present invention as the same could be coupled with an object while the toggle assembly is being passed through an opening formed in a supportive structure;

FIG. 4 depicts a side elevation view of the toggle assembly depicted in FIG. 3 and demonstrates one manner in which the toggle assembly may engage a rearward surface of a supportive structure.

DETAILED DESCRIPTION

Figure 1:
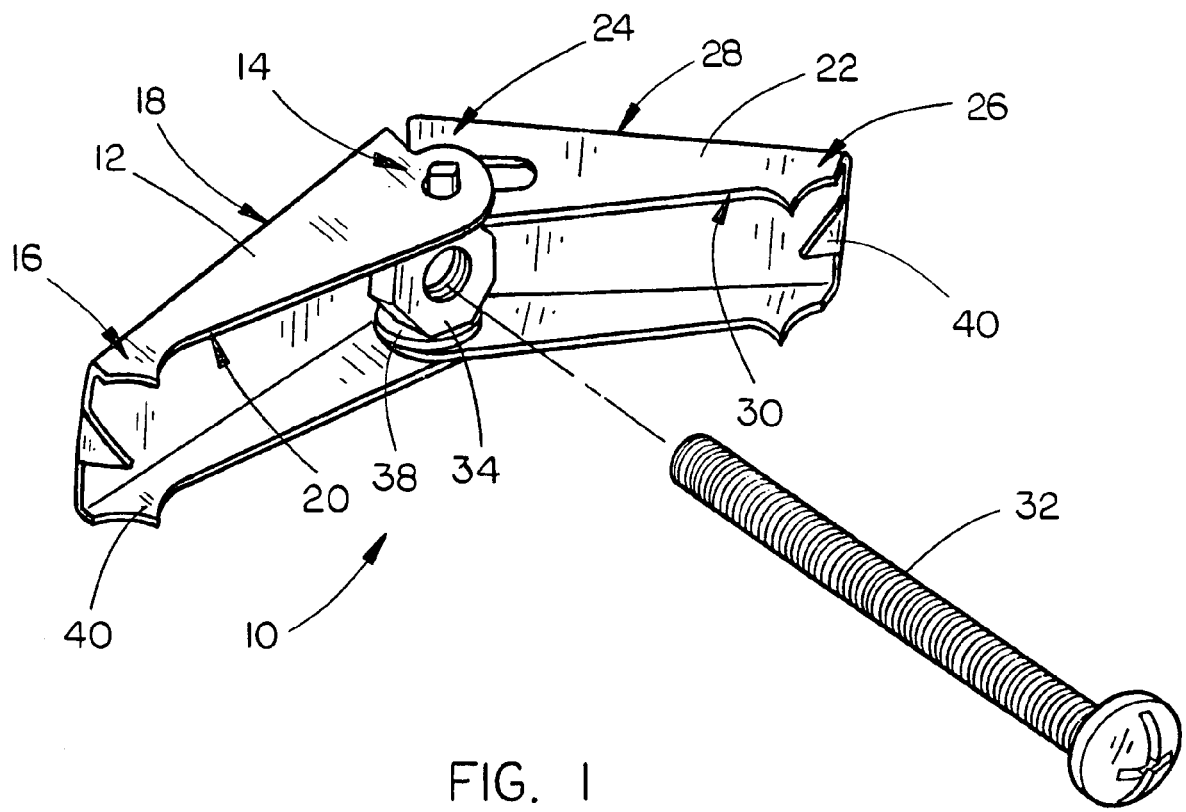
FIG. 1 is a perspective view of one embodiment of the toggle assembly of the present invention.
Figure 2:
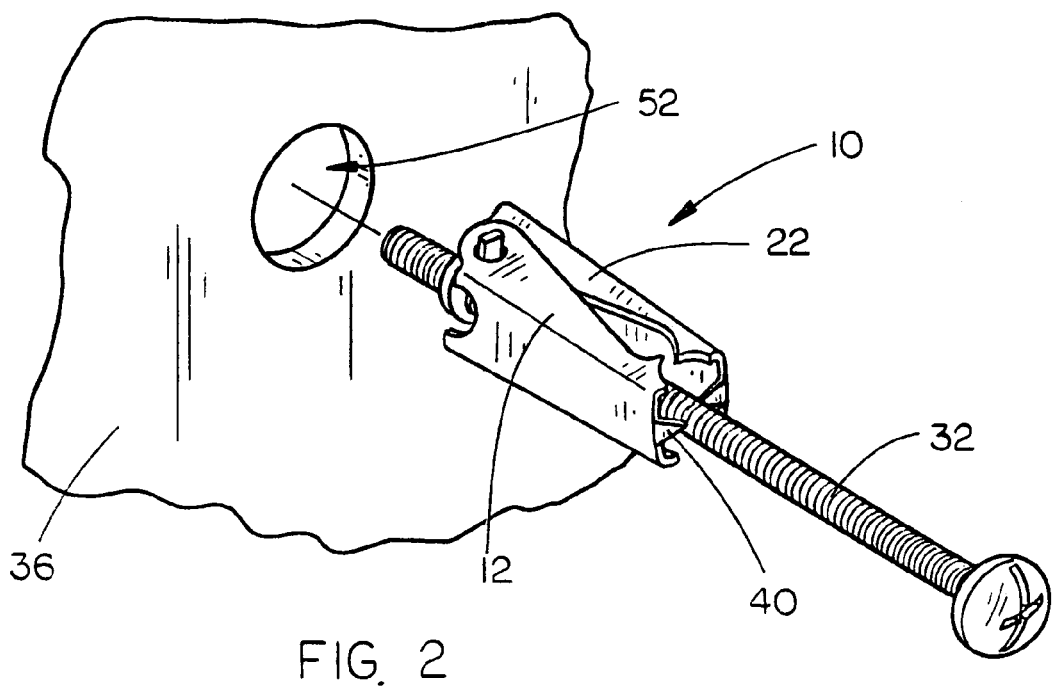
FIG. 2 depicts an isometric view of one embodiment of the toggle assembly of the present invention as the same could be used with a fastener and passed through an opening formed in a supportive structure.

Embodiments are described more fully below with reference to the accompanying drawings, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In a preferred embodiment, the toggle assembly 10 of the present invention is provided with a first wing member 12, having a first end portion 14, second end portion 16, upper portion 18 and a lower edge portion 20. A second wing member 22 is also provided, having a first end portion 24, second end portion 26, upper portion 28 and lower edge portion 30. The first end portion 14 of the first wing member 12 should be operatively coupled with the first end portion 24 of the second wing member 22 so that the first wing member 12 and second wing member 22 may be moved between open and closed positions with respect to one another. FIGS. 3 and 4 depict examples of such closed and open positions, respectively. In one embodiment, the first wing member 12 and second wing member 22 may be pivotably coupled to one another using one of various known forms of pivot pin arrangements.

A means should provided for securably receiving a fastener 32 adjacent the first end portions 14 and 24 of the first and second wing members 12 and 22. Various structures are contemplated for such means and will generally depend upon the type of fastener 32 to be used. For example, FIG. 1 depicts the fastener 32 as being a threaded bolt. Accordingly, a nut 34 may be provided for threadably receiving the fastener 32 in a conventional manner. However, other fasteners and securement members are contemplated and the various types thereof are nearly limitless.

While the first wing member 12 and second wing member 22 are preferably moveable between their open and closed positions selectively, it is contemplated that the toggle assembly 10 may not be accessible once it is positioned behind a supportive structure 36, such as a wall, ceiling, and the like. Accordingly, a biasing means, such as a spring 38 or the like, should be provided adjacent the first end portions 14 and 24 of the first and second wing members 12 and 22 so that the toggle assembly 10 is biased toward the open position.

In a preferred embodiment, at least one tooth 40 is positioned adjacent the lower edge portion of one or both of the first and second wing members 12 and 22. The tooth 40 should be provided with a point that is shaped and positioned to engage the supportive structure when the first and second wing members 12 and 22 are in an open position and the lower edge portions 20 and 30 of the first and second wing members 12 and 22 are positioned closely adjacent the supportive structure. The point on the tooth 40 should be sufficiently sharp and rigid to securably engage a surface of the supportive structure 26 with the application of a minimal amount of pressure. While in many instances it may be preferable for the tooth 40 to be capable of at least partially piercing the surface of the supportive structure 36, some applications may merely require that sufficient engagement be maintained between the tooth 40 and the supportive structure 36 such that relative movement between the two structures are minimized when the fastener 32 is advanced through the toggle assembly 10.

While only one tooth 40 may be necessary for purposes of the invention, a plurality of teeth 40 are preferred. Various positions and arrangements of the teeth 40 are contemplated. For example, the lower edge portions 20 and 30 of the first and second wing members 12 and 22 are depicted in FIG. 1 as having generally opposite side portions 42 and 44 and an end portion 46. One or more teeth 40 may be positioned to extend outwardly from at least one or both of the opposite side portions 42 and 44 of the lower edge portion of either wing member. Likewise, one or more teeth 40 may be positioned to extend outwardly from the end portion 46 of the lower edge portion of either or both of the wing members.

Figure 5:
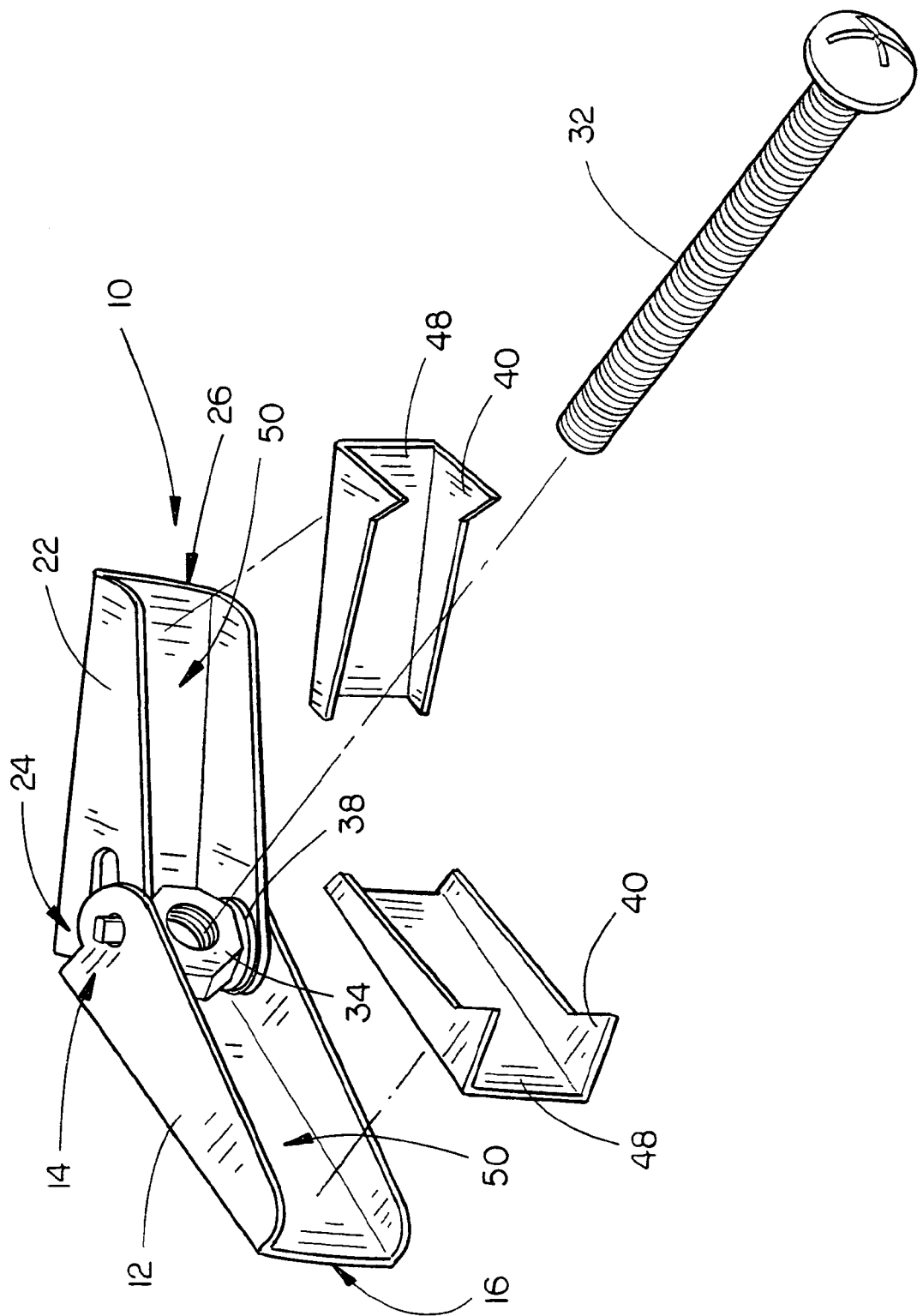
FIG. 5 depicts a partially exploded, isometric view of another preferred embodiment of the toggle assembly of the present invention.

While it is contemplated that the teeth 40 may simply be formed with the first and second wing members 12 and 22 in unitary construction, it is also contemplated that the teeth 40 may be provided as part of an insert 48 as depicted in FIG. 5. In a preferred embodiment, the insert 48 is shaped and sized to be received within a recess 50 in either or both of the first wing member 12 and second wing member 22. The insert 48 may be provided in a one-piece or two-piece (as depicted) fashion, as the circumstances deem prudent. However configured, the insert 48 should be shaped and sized to position one or more teeth 40 adjacent the lower edge portion of one or both of the wing members. In one embodiment, the insert 48 should be provided to fit within the recess 50 with a tight tolerance to provide a pressure-fit that relies primarily upon the size and shape of the insert 48 and its frictional engagement within the recess 50. However, various structural details, including dimples and small fasteners are contemplated. Likewise, adhesives disposed on one or both of the insert 48 or recess 50 may be provided to secure the structures to one another. It is contemplated that it is merely important to secure the structures together in a manner sufficient to pass the toggle assembly 10 through a supportive structure 36, during the opening of the toggle assembly 10, and until the one or more teeth 40 are engaged with a rearward surface of the supportive structure 36.

The toggle assembly 10 is preferably configured in a manner that provides simple and quick and use of the same. First, an opening 52 should be formed through the supportive structure 36 such that the opening 52 is provided with a diameter sufficient to permit the toggle assembly 10 to pass therethrough, while in a closed position. The fastener 32 may be passed through an object 54 to be coupled with the supportive structure 56. The fastener 32 may then be coupled with the nut 34 or other means being used in place thereof. The toggle assembly 10 may then be moved to a closed position and passed through the opening 52. Once through the opening 52, the toggle assembly should be moved, manually or automatically, into an open position, such that the toggle assembly may not be withdrawn through the opening 52. The one or more teeth 40 should then be engaged with a rearward surface of the supportive structure 36. This may be done by applying a force to the fastener 32 in a direction generally opposite to the direction traveled by the toggle assembly 10 when it was passed through the opening 52 in the supportive structure 36. The fastener 32 may then be manipulated with respect to the toggle assembly 10 so that the fastener 32 is at least partially advanced through the opening 52 in the supportive structure 36. Engagement of the one or more teeth 40 with the supportive structure 36 should substantially limit movement of the toggle assembly 10 with respect to the supportive structure 36 and permit advancement of the fastener 32 with respect to the toggle assembly 10 until a tight engagement is obtained between the supportive structure 36 and the object 54.

Although the invention has been described in language that is specific to structural features and/or methodological steps, it is to be understood that the invention defined in the appended claims is not necessarily limited to the specific features or steps described. Rather, the specific features and steps are described as forms of implementing the claimed invention. Since many embodiments of the invention can be made without departing from the spirit and scope of the invention, the invention resides in the claims hereinafter appended.

I claim:

1. A toggle assembly for use with a fastener to engage a supportive structure, the toggle assembly comprising:
    a first wing member having opposite first and second end portions, an upper portion and a lower edge portion; said lower edge portion of said first wing member having opposite side portions and an end portion;
    a second wing member having opposite first and second end portions, an upper portion and lower edge portion; said first end portion of said second wing member being operatively coupled with the first end portion of said first wing member so that said first and second wing members may be selectively moved between open and closed positions with respect to one another;
    means for securably receiving the fastener adjacent the first end portions of said first end portions of said first and second wing members; and
    a plurality of teeth adjacent the lower edge portion of said first wing member; said plurality of teeth each having a point that is shaped and positioned to engage the supportive structure when said first and second wing members are in said open position and the lower edge portions of said first and second wing members are positioned closely adjacent the supportive structure
    at least one of said plurality of teeth being positioned to extend outwardly from at least one of the opposite side portions of said lower edge portion;
    at least one of said plurality of teeth being positioned to extend outwardly from the end portion of said lower edge portion.

2. The toggle assembly of claim 1 further comprising at least one tooth adjacent the lower edge portion of said second wing member.

3. The toggle Assembly of claim 1 wherein said at least one tooth is positioned to extend outwardly from the end portion of said lower edge portion.

4. The toggle assembly of claim 1 wherein said at least one tooth is positioned to extend outwardly from at least one of the opposite side portions of said lower edge portion.

5. The toggle assembly of claim 1 wherein a plurality of teeth members are provided adjacent the lower edge portion of said second wing member.

6. A method of using the toggle assembly of claim 1 with a fastener to engage a supportive structure, the method comprising:

a) forming a hole through the supportive structure that is at least large enough to receive said toggle assembly in said closed position;
    b) securing the fastener to said toggle assembly;
    c) passing the toggle assembly through the opening in the supportive structure;
    d) moving said first and second wing members into said open position;
    e) engaging said at least one of said plurality of teeth with a rearward surface of the supportive structure; and
    f) manipulating the fastener with respect to said toggle assembly so that the fastener is at least partially advanced through the opening on the supportive structure.

7. The method of claim 6 wherein said first and second wing members are automatically moved into said open position by a spring associated with said first and second wing members.

8. The method of claim 6 wherein said at least one of said plurality of teeth is engaged with the rearward surface of the supporting structure by applying a force to the fastener in a direction generally opposite to a direction traveled by said toggle assembly when it was passed through the opening in the supportive structure.

9. A toggle assembly for use with a fastener to engage a supportive structure, the toggle assembly comprising:
    a first wing member having opposite first and second end portions, an upper portion and a lower edge portion; said lower edge portion of said first wing member having opposite side portions and an end portion;
    a second wing member having opposite first and second end portions, an upper portion and lower edge portion; said first end portion of said second wing member being operatively coupled with the first end portion of said first wing member so that said first and second wing members may be selectively moved between open and closed positions with respect to one another;
    means for securably receiving the fastener adjacent the first end portions of said first end portions of said first and second wing members;
    a spring operatively engaged with said first and second wing members so that said first and second wing members are biased toward said open position;
    a first insert that is shaped and sized to approximate, and be at least partially disposed within, a recess formed adjacent the lower edge portion of said first wing member; and
    at least one tooth extending outwardly from a lower end portion of said first insert such that said at least one tooth is positioned adjacent the lower edge portion of said first wing member when said insert is at least partially disposed within said recess; said at least one tooth having a point that is shaped and positioned to engage the supportive structure when said first and second wing members are in said open position and the lower edge portions of said first and second wing members are positioned closely adjacent the supportive structure.

10. The toggle assembly of claim 9 further comprising a second insert that is shaped and sized to be at least partially disposed within a recess formed adjacent the lower edge portion of said second wing member; said at least one tooth extending outwardly from a lower end portion of said insert such that said at least one tooth is positioned adjacent the lower edge portion of said second wing member when said insert is at least partially disposed within said recess.

11. The toggle assembly of claim 9 wherein said first insert is selectively removable from said recess; said insert being shaped and sized to be secured within said recess in a pressure-fit manner by frictional engagement with at least the opposite side portions of said first wing member.

12. A method of using the toggle assembly of claim 9 with a fastener to engage a supportive structure, the method comprising:
   a) forming a hole through the supportive structure that is at least large enough to receive said toggle assembly in said closed position;
   b) securing said first insert within the recess of said first wing member;
   c) securing the fastener to said toggle assembly;
   d) passing the toggle assembly through the opening in the supportive structure;
   e) moving said first and second wing members into said open position;
   f) engaging said at least one tooth with a rearward surface of the supportive structure; and
   g) manipulating the fastener with respect to said toggle assembly so that the fastener is at least partially advanced through the opening on the supportive structure.

13. The method of claim 12 wherein said first and second wing members are automatically moved into said open position by said spring.

14. The method of claim 13 wherein said at least one tooth is engaged with the rearward surface of the supporting structure by applying a force to the fastener in a direction generally opposite to a direction traveled by said toggle assembly when it was passed through the opening in the supportive structure.

* * * * *